United States Patent
Khoshnevisan et al.

(10) Patent No.: US 11,791,961 B2
(45) Date of Patent: Oct. 17, 2023

(54) MEDIA ACCESS CONTROL (MAC) CONTROL ELEMENT (CE) SPATIAL RELATION INFORMATION UPDATE FOR SOUNDING REFERENCE SIGNAL (SRS)

(71) Applicant: QUALCOMM Incorporated, San Diego, CA (US)

(72) Inventors: Mostafa Khoshnevisan, San Diego, CA (US); Xiaoxia Zhang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/379,556

(22) Filed: Jul. 19, 2021

(65) Prior Publication Data
US 2022/0021498 A1  Jan. 20, 2022

Related U.S. Application Data

(60) Provisional application No. 63/054,158, filed on Jul. 20, 2020.

(51) Int. Cl.
*H04L 5/00* (2006.01)
*H04W 48/08* (2009.01)

(52) U.S. Cl.
CPC ........... *H04L 5/0048* (2013.01); *H04W 48/08* (2013.01)

(58) Field of Classification Search
CPC ... H04L 5/0048; H04L 1/0041; H04L 5/0051; H04L 27/26025; H04L 5/10;
(Continued)

(56) References Cited

U.S. PATENT DOCUMENTS 10,512,072 B2 * 12/2019 Yi ................. H04W 72/542
2016/0337076 A1 * 11/2016 Hwang ............. H04L 1/0041
(Continued)

FOREIGN PATENT DOCUMENTS

CN  113519191 A * 10/2021 .......... H04W 72/042

OTHER PUBLICATIONS

Huawei., et al., "Enhancements on Multi-Beam Operation", 3GPP TSG RAN WG1 Meeting #99, 3GPP Draft, R1-1911903, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 7 Pages, XP051823085, Retrieved from the Internet: URL: https://www.3gpp.org/ftp/tsg_ran/WG1_RL1/TSGR1_99/Docs/R1-1911903.zip, [retrieved on Nov. 9, 2019], Section 3.5.
(Continued)

*Primary Examiner* — Ayaz R Sheikh
*Assistant Examiner* — Louis Samara
(74) *Attorney, Agent, or Firm* — ArentFox Schiff LLP

(57) ABSTRACT

The present disclosure relates to media access control (MAC) control element (CE) spatial relation information update for sounding reference signal (SRS). Specifically, a user equipment (UE) may receive a MAC CE from a network entity indicating a synchronization signal block (SSB) set and a SSB index within the SSB set as a reference signal (RS) for configuring spatial relation information of a SRS resource, wherein the UE is configured with a plurality of SSB sets corresponding to a plurality of physical cell identifications (PCIs) in a serving cell; and updating spatial relation information for one or more SRS resources within a SRS resource set based on the MAC CE.

30 Claims, 10 Drawing Sheets

(58) Field of Classification Search
CPC .. H04L 5/0094; H04W 48/08; H04W 72/046; H04W 72/23; H04W 48/16; H04W 8/24; H04W 72/042; H04W 72/542

See application file for complete search history.

(56) References Cited

U.S. PATENT DOCUMENTS

| | | | | |
|---|---|---|---|---|
| 2020/0314829 | A1* | 10/2020 | Venugopal | H04W 72/23 |
| 2021/0243837 | A1* | 8/2021 | Jung | H04W 8/24 |
| 2022/0029764 | A1* | 1/2022 | Liou | H04L 5/0094 |
| 2022/0209916 | A1* | 6/2022 | Krishnamoorthy | H04L 27/26025 |
| 2022/0239453 | A1* | 7/2022 | Matsumura | H04L 5/0051 |
| 2022/0322325 | A1* | 10/2022 | Svedman | H04W 72/046 |
| 2022/0376868 | A1* | 11/2022 | Määttänen | H04L 5/0051 |
| 2022/0386154 | A1* | 12/2022 | Maattanen | H04W 48/16 |
| 2022/0417980 | A1* | 12/2022 | Cirik | H04L 5/10 |
| 2023/0104029 | A1* | 4/2023 | Matsumura | H04L 5/0051 370/329 |

OTHER PUBLICATIONS

International Search Report and Written Opinion—PCT/US2021/042363—ISA/EPO—dated Oct. 26, 2021.

Qualcomm Incorporated: "Remaining Issues on DL MIMO MAC CE", 3GPP TSG-RAN WG2 Meeting #110e, 3GPP Draft, R2-2005185, 3rd Generation Partnership Project (3GPP), Mobile Competence Centre, 650, Route Des Lucioles, F-06921 Sophia-Antipolis Cedex, France, vol. RAN WG2, No. Electronic, Jun. 1, 2020-Apr. 12, 2020, May 22, 2020 (May 22, 2020), pp. 1-6, XP051888617, Retrieved from the Internet: URL: https://www.3gpp.org/ftp/TSG_RAN/WG2_RL2/TSGR2_110-e/Docs/R2-2005185.zip, [retrieved on May 22, 2020], Section 3.

Qualcomm Incorporated: "Semi-Persistent and Aperiodic SRS-for-Positioning", 3GPP TSG-RAN WG2 Meeting #109-e, R2-2001214, 3rd Generation Partnership Project (3GPP), Mobile Competence Centre, 650, Route Des Lucioles, F-06921 Sophia-Antipolis Cedex, France, vol. RAN WG2, No. Online, Feb. 24, 2020-Mar. 6, 2020, Feb. 14, 2020, pp. 1-20, XP051849544, Retrieved from the Internet: URL: https://www.3gpp.org/ftp/tsg_ran/WG2_RL2/TSGR2_109_e/Docs/R2-2001214.zip, R2-2001214 (SP SRS Discussion).docx, the whole document.

* cited by examiner

400

| | | | | | | | |
|---|---|---|---|---|---|---|---|

| A/D | SRS Resource Set's Cell ID | | | SRS Resource Set's BWP ID | Oct 1 |
|---|---|---|---|---|---|
| R | R | C | SUL | SP SRS Resource Set ID | Oct 2 |
| $F_0$ | Resource $ID_0$ | | | | Oct 3 |

...

| $F_{M-1}$ | Resource $ID_{M-1}$ | | Oct N-M |
|---|---|---|---|
| R | Resource Serving Cell $ID_0$ | Resource BWP $ID_0$ | Oct N-M+1 |

...

| R | Resource Serving Cell $ID_{M-1}$ | Resource BWP $ID_{M-1}$ | Oct N |
|---|---|---|---|

FIG. 4

MEDIA ACCESS CONTROL (MAC) CONTROL ELEMENT (CE) SPATIAL RELATION INFORMATION UPDATE FOR SOUNDING REFERENCE SIGNAL (SRS)

CROSS-REFERENCE TO RELATED APPLICATION(S)

The present application claims benefit of U.S. Provisional Application No. 63/054,158 entitled "MEDIA ACCESS CONTROL (MAC) CONTROL ELEMENT (CE) SPATIAL RELATION INFORMATION UPDATE FOR SOUNDING REFERENCE SIGNAL (SRS)" filed Jul. 20, 2020, which is assigned to the assignee hereof and hereby expressly incorporated by reference herein.

BACKGROUND

Aspects of the present disclosure relate generally to wireless communication systems, and more particularly, to media access control (MAC) control element (CE) spatial relation information update for sounding reference signal (SRS).

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) including receiving a media access control (MAC) control element (CE) from a network entity indicating a synchronization signal block (SSB) set and a SSB index within the SSB set as a reference signal (RS) for spatial relation information of sounding reference signal (SRS) resource, wherein the UE is configured with a plurality of SSB sets corresponding to a plurality of physical cell identifications (PCIs) in a serving cell; and updating spatial relation information for one or more SRS resources within a SRS resource set based on the MAC CE.

In a further example, an apparatus for wireless communication is provided that includes a transceiver, a memory configured to store instructions, and one or more processors communicatively coupled with the transceiver and the memory. The one or more processors are configured to execute the instructions to receive a MAC CE from a network entity indicating a SSB set and a SSB index within the SSB set as a RS for spatial relation information of SRS resource, wherein the UE is configured with a plurality of SSB sets corresponding to a plurality of PCIs in a serving cell; and update spatial relation information for one or more SRS resources within a SRS resource set based on the MAC CE.

In another aspect, an apparatus for wireless communication is provided that includes means for receiving a MAC CE from a network entity indicating a SSB set and a SSB index within the SSB set as a RS for spatial relation information of SRS resource, wherein the UE is configured with a plurality of SSB sets corresponding to a plurality of PCIs in a serving cell; and means for updating spatial relation information for one or more SRS resources within a SRS resource set based on the MAC CE.

In yet another aspect, a non-transitory computer-readable medium is provided including code executable by one or more processors to receive a MAC CE from a network entity indicating a SSB set and a SSB index within the SSB set as a RS for spatial relation information of SRS resource, wherein the UE is configured with a plurality of SSB sets corresponding to a plurality of PCIs in a serving cell; and update spatial relation information for one or more SRS resources within a SRS resource set based on the MAC CE.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is an example representation of media access control (MAC) control element (CE) for a semi-persistent sounding reference signal (SRS) resource set activation/deactivation.

DETAILED DESCRIPTION

Figure 1:
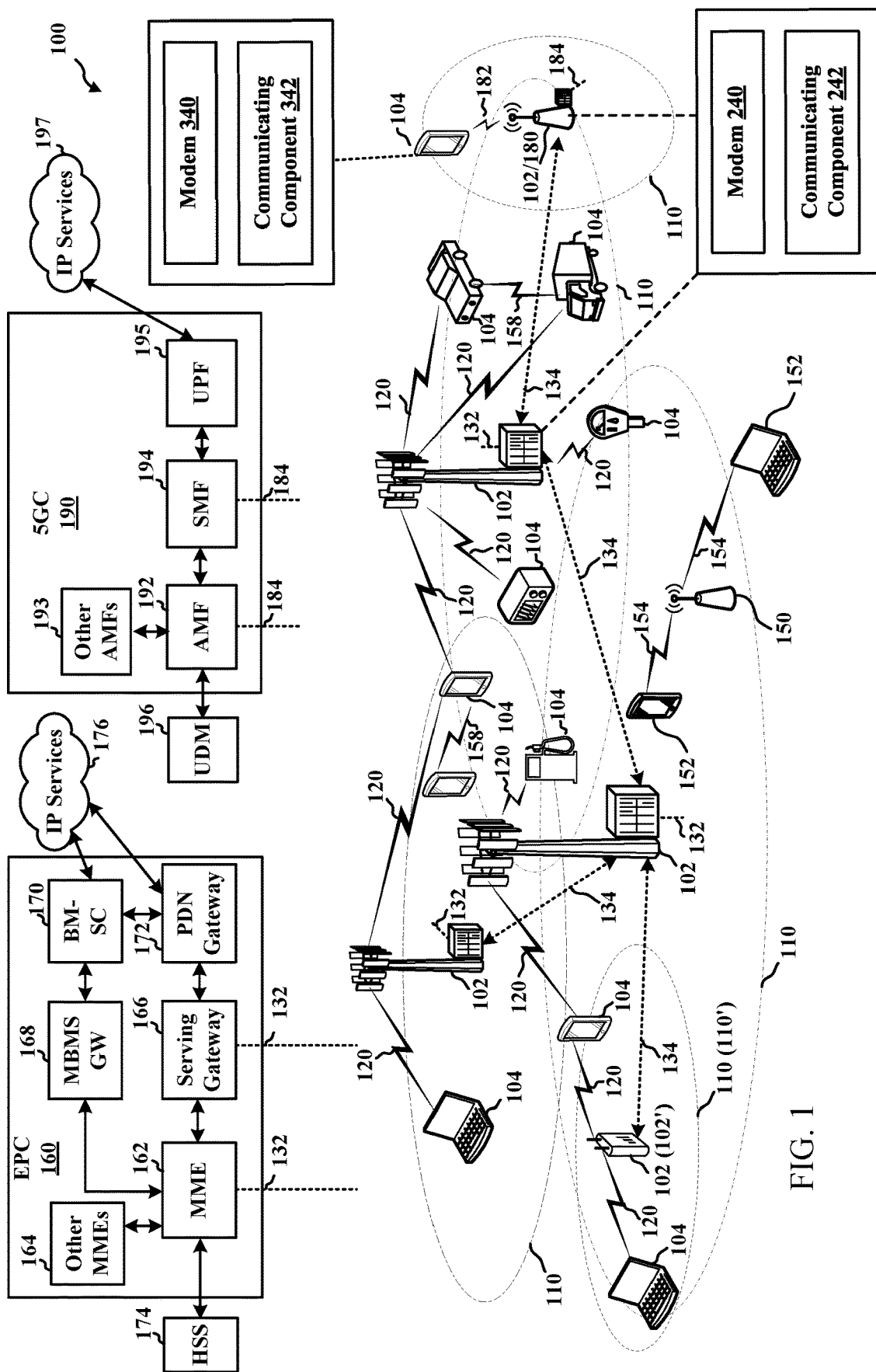
FIG. 1 illustrates an example of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to media access control (MAC) control element (CE) spatial relation information update for sounding reference signal (SRS). Specifically, spatial relation information may be configured per SRS resource through a radio resource control (RRC). A reference signal (RS) for spatial relation information for a SRS resource may be at least one of an SSB index (e.g. 0-63 for FR2, or 0-7 for FR1) (UE may transmit the target SRS resource with the same spatial domain transmission filter used for the reception of the reference synchronization signal block (SSB), a CSI-RS resource: UE shall transmit the target SRS resource with the same spatial domain transmission filter used for the reception of the reference channel state information reference signal (CSI-RS) resource, and a SRS resource (e.g., UE may transmit the target SRS resource with the same spatial domain transmission filter used for the transmission of the reference SRS resource). The ServingCellId/uplinkBWP (e.g., for SRS) are for the reference resource, and if not configured, the reference resource is the same as the target SRS. For example, one SRS resource set may include multiple SRS resources. A SRS resource set may be at least one of periodic (e.g., configured by RRC), semi-persistent (e.g., activated/deactivated by MAC-CE), or aperiodic (e.g., triggered by downlink control information (DCI)).

In an aspect, the PCI/SSB set for a given serving cell is determined through cell search procedures. For example, non-serving cell PCI may be configured by dedicated RRC signaling for a serving cell/component carrier (CC) (e.g., Pcell or Scell). A secondary SSB set is configured for the UE associated with the non-serving cell PCI allowing for multi-TRP operations in one serving cell when the second TRP has a different PCI (e.g., inter-cell multi-TRP). Further, a list of additional PCIs/SSB sets in a given serving cell (i.e., multiple secondary (or non-serving cell's) PCIs/SSB sets) are provided. In this instance, a reference signal for spatial relation information of a SRS resource may be a SSB index from one of the secondary SSB sets in a serving cell.

For example, in an aspect, the present disclosure includes a method, apparatus, and computer readable medium for wireless communications for efficient MAC-CE spatial relation information update for SRS. That is, when RS for spatial relation information of a SRS resource is an SSB-index, the corresponding SSB set that the SSB-index belongs to also needs to be indicated in the MAC-CE. The aspect may include receiving a MAC CE from a network entity indicating a SSB set and a SSB index within the SSB set as a RS for spatial relation information of SRS resource, wherein the UE is configured with a plurality of SSB sets corresponding to a plurality of PCIs in a serving cell; and updating spatial relation information for one or more SRS resources within a SRS resource set based on the MAC CE.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for transmitting, to a UE 104, various data, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for media access control (MAC) control element (CE) spatial relation information update for sounding reference signal (SRS), as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 7:
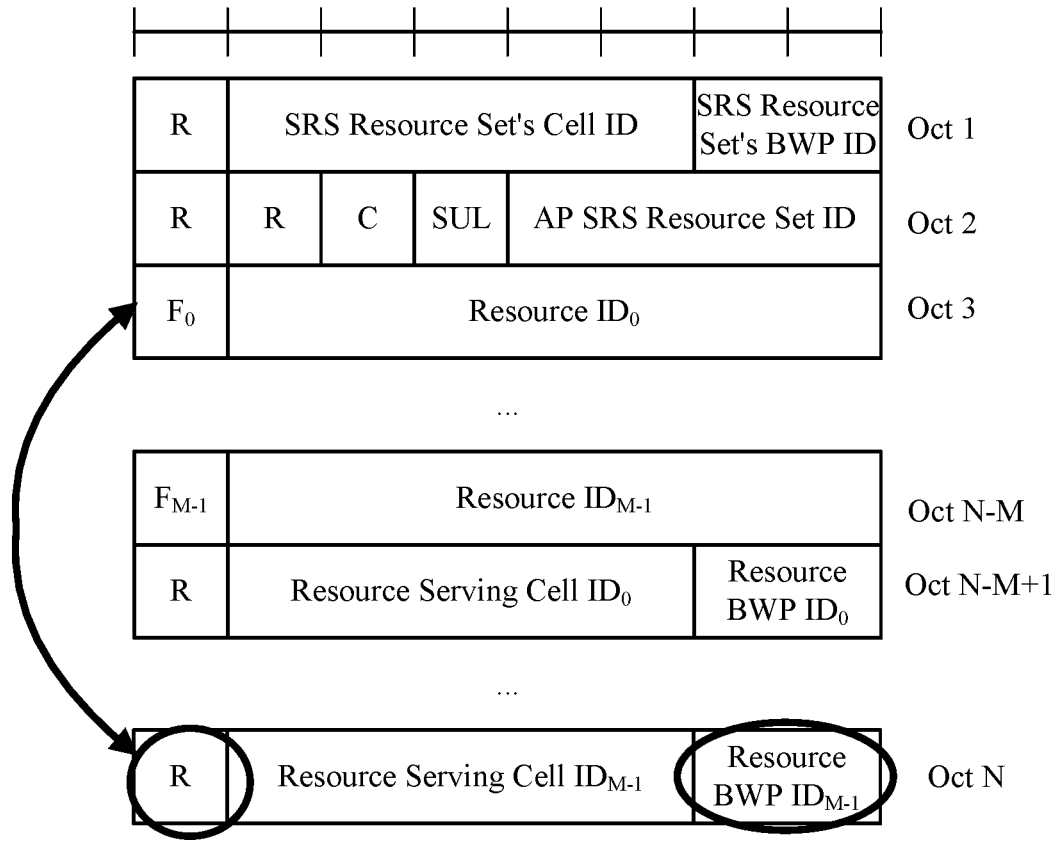
FIG. 7 illustrates an example representation of a MAC CE using a resource bandwidth part (BWP) identification (ID) field and a reserved field.
Figure 8:
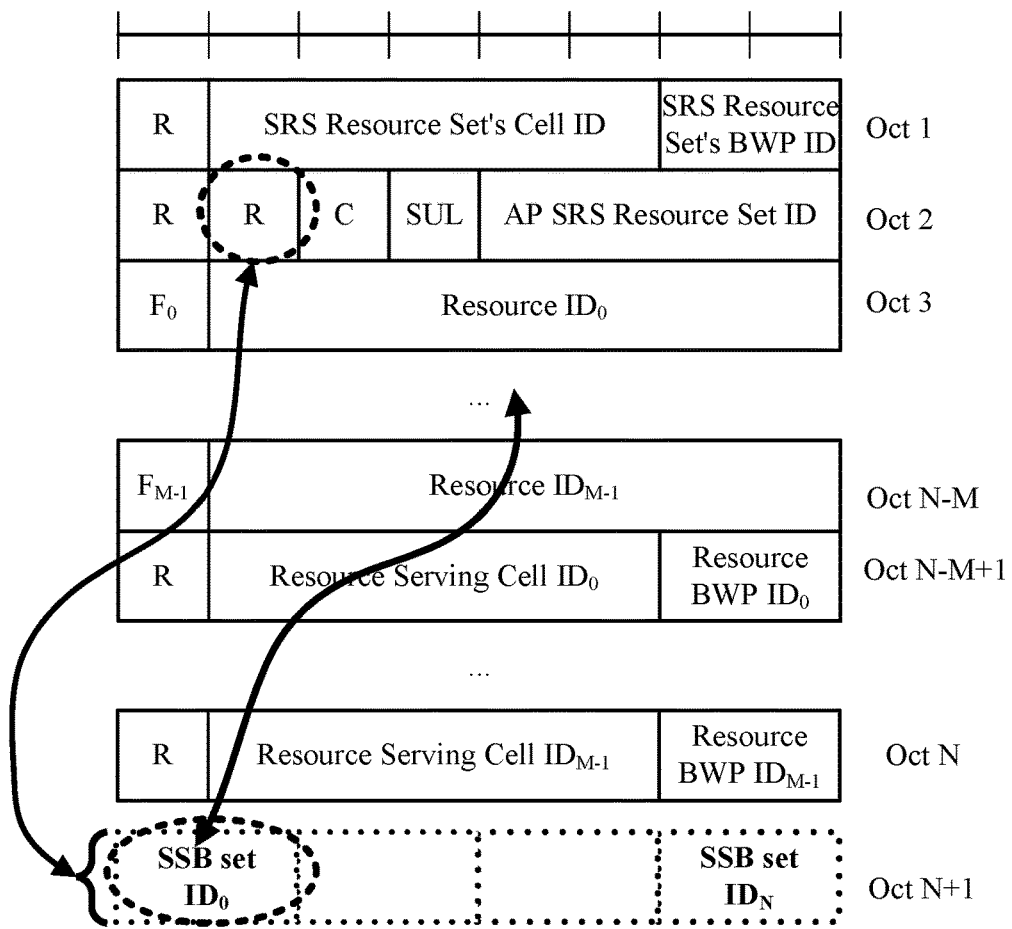
FIG. 8 illustrates an example representation of a MAC CE using one or more synchronization signal block (SSB) ID fields.
Figure 9:
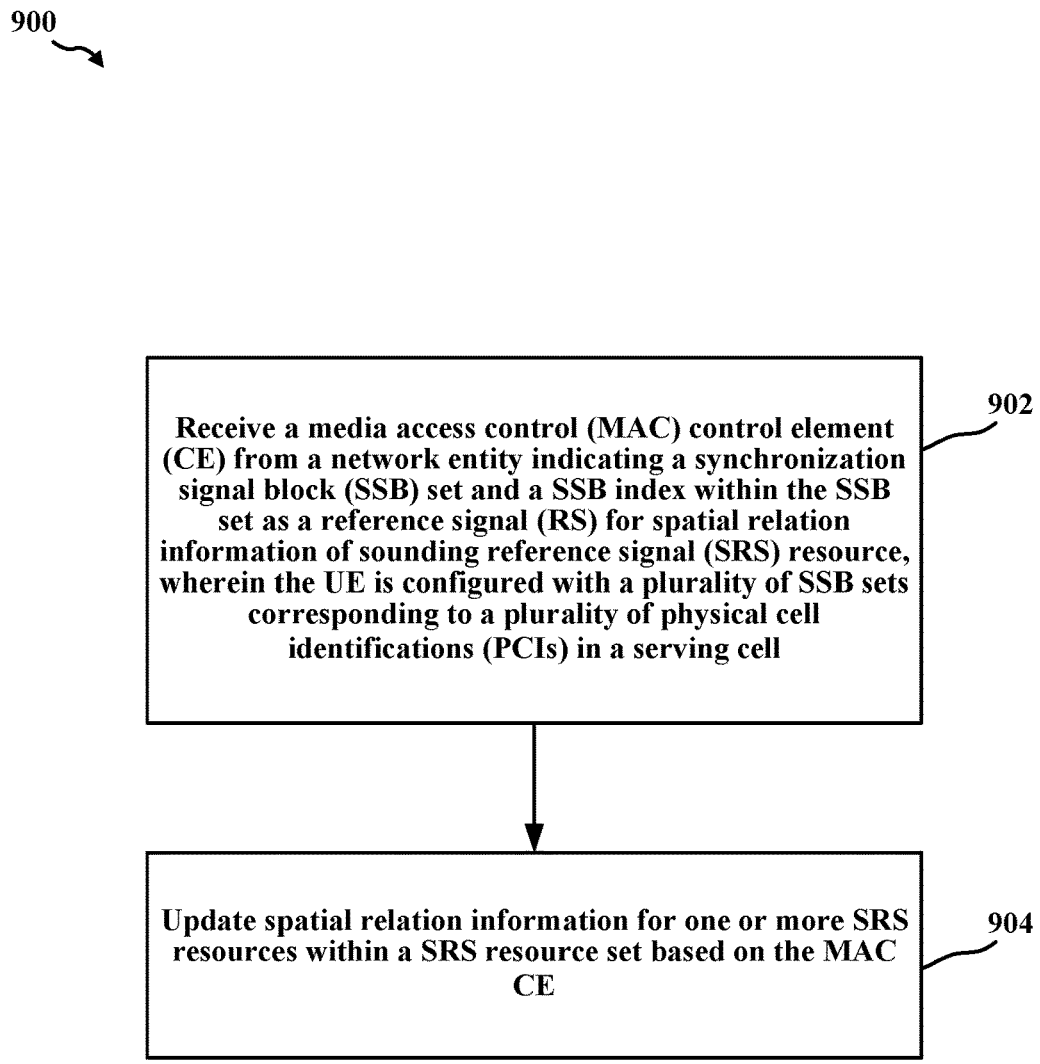
FIG. 9 is a flowchart of an example method of wireless communication at a UE.

Turning now to FIGS. 2-10, aspects are depicted with reference to one or more components and one or more methods that may perform the actions or operations described herein, where aspects in dashed line may be optional. Although the operations described below in FIG. 9 is presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
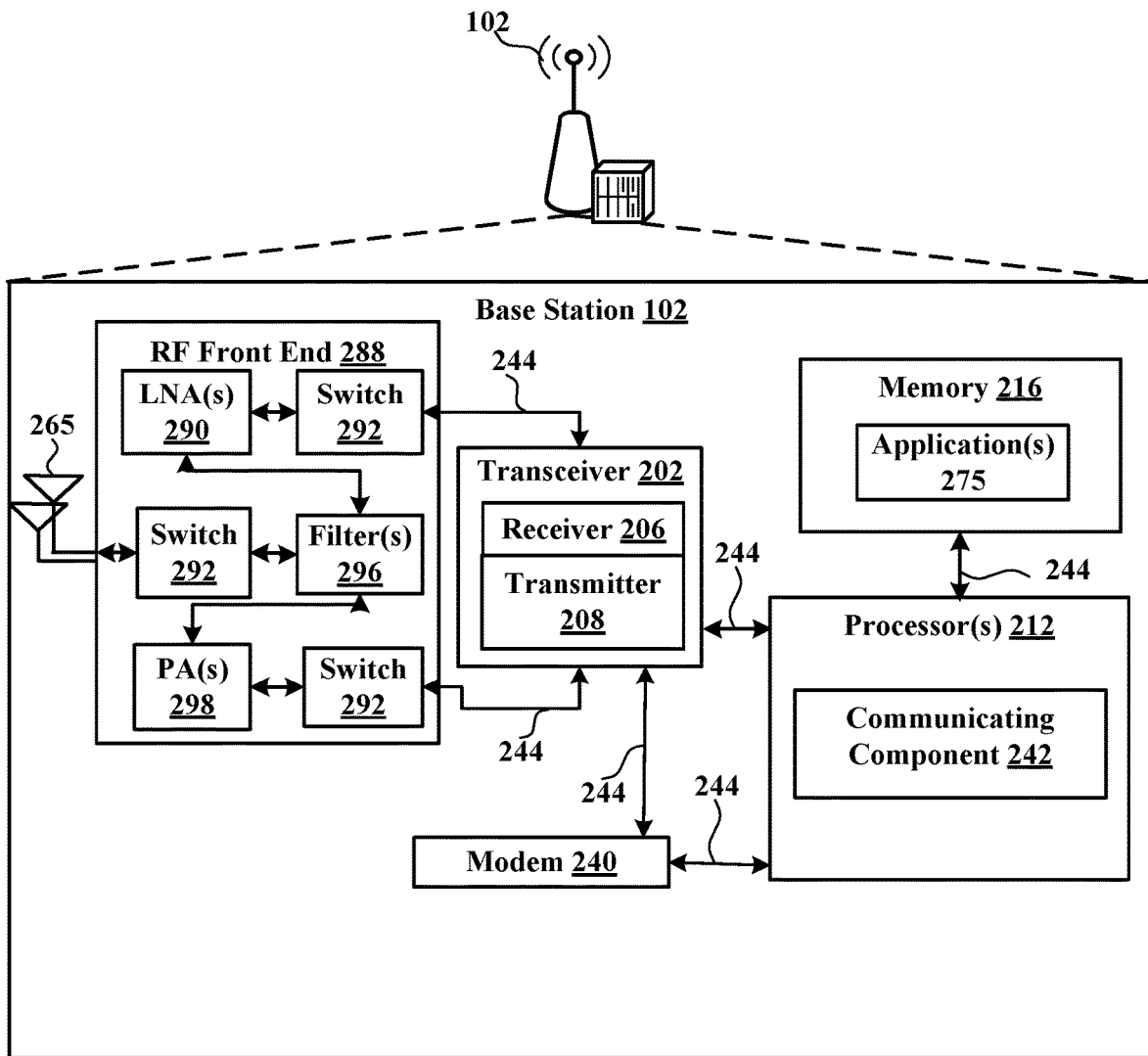
FIG. 2 is a block diagram illustrating an example of a network entity (also referred to as a base station).

FIG. 2 is a block diagram illustrating an example of a network entity (also referred to as a base station). The base station (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIG. 9. Similarly, the memory 216 may correspond to the memory described in connection with the UE in FIG. 7.

Figure 3:
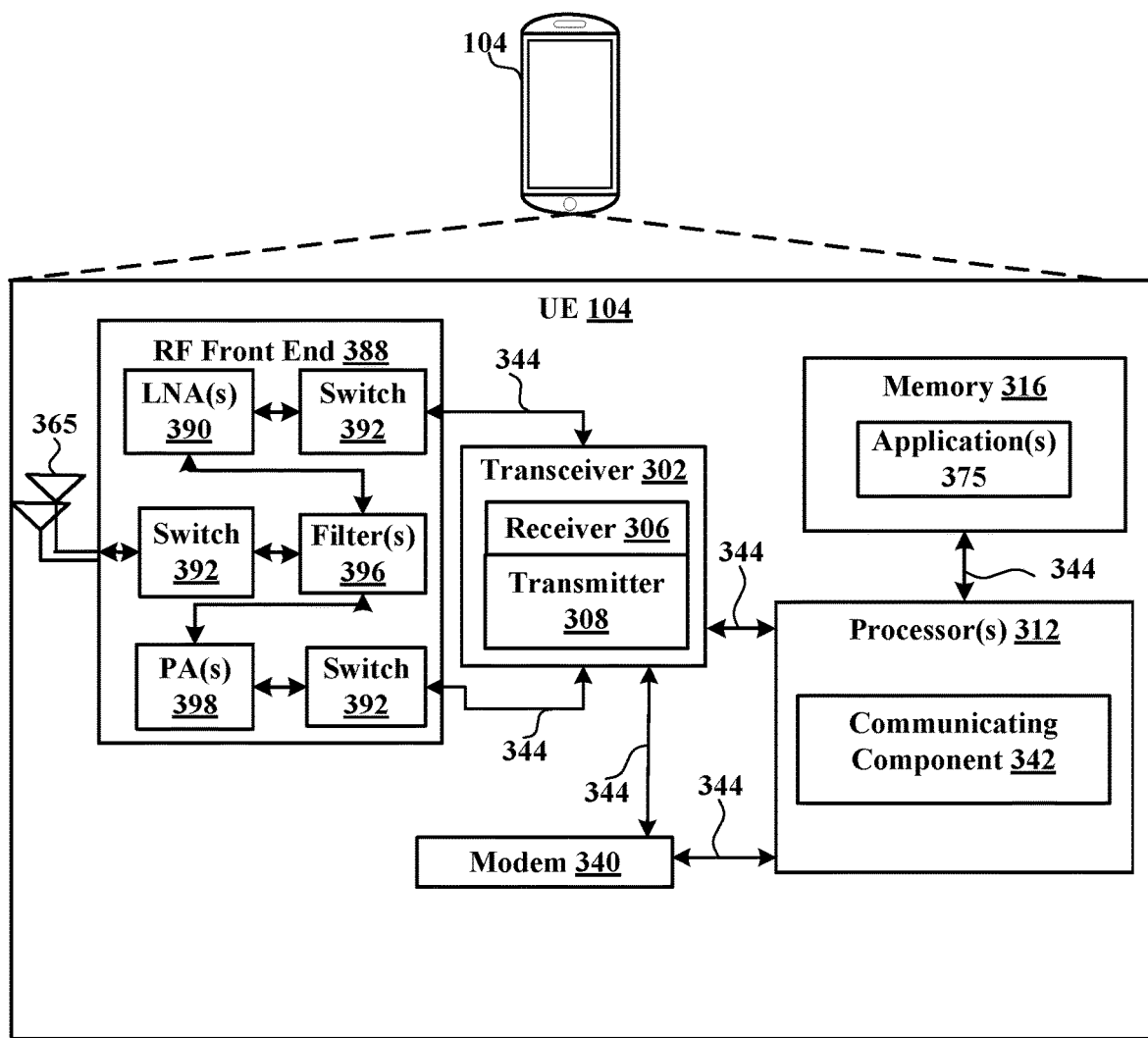
FIG. 3 is a block diagram illustrating an example of a user equipment (UE).

FIG. 3 is a block diagram illustrating an example of a UE 104. The UE 104 may include a variety of components, some of which have already been described above and are described further herein, including components such as one or more processors 312 and memory 316 and transceiver 302 in communication via one or more buses 344, which may operate in conjunction with modem 340 or communicating component 342 for multiplexing UCI with a multi-slot PUSCH transmission based on a scaling rate.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

Figure 5:
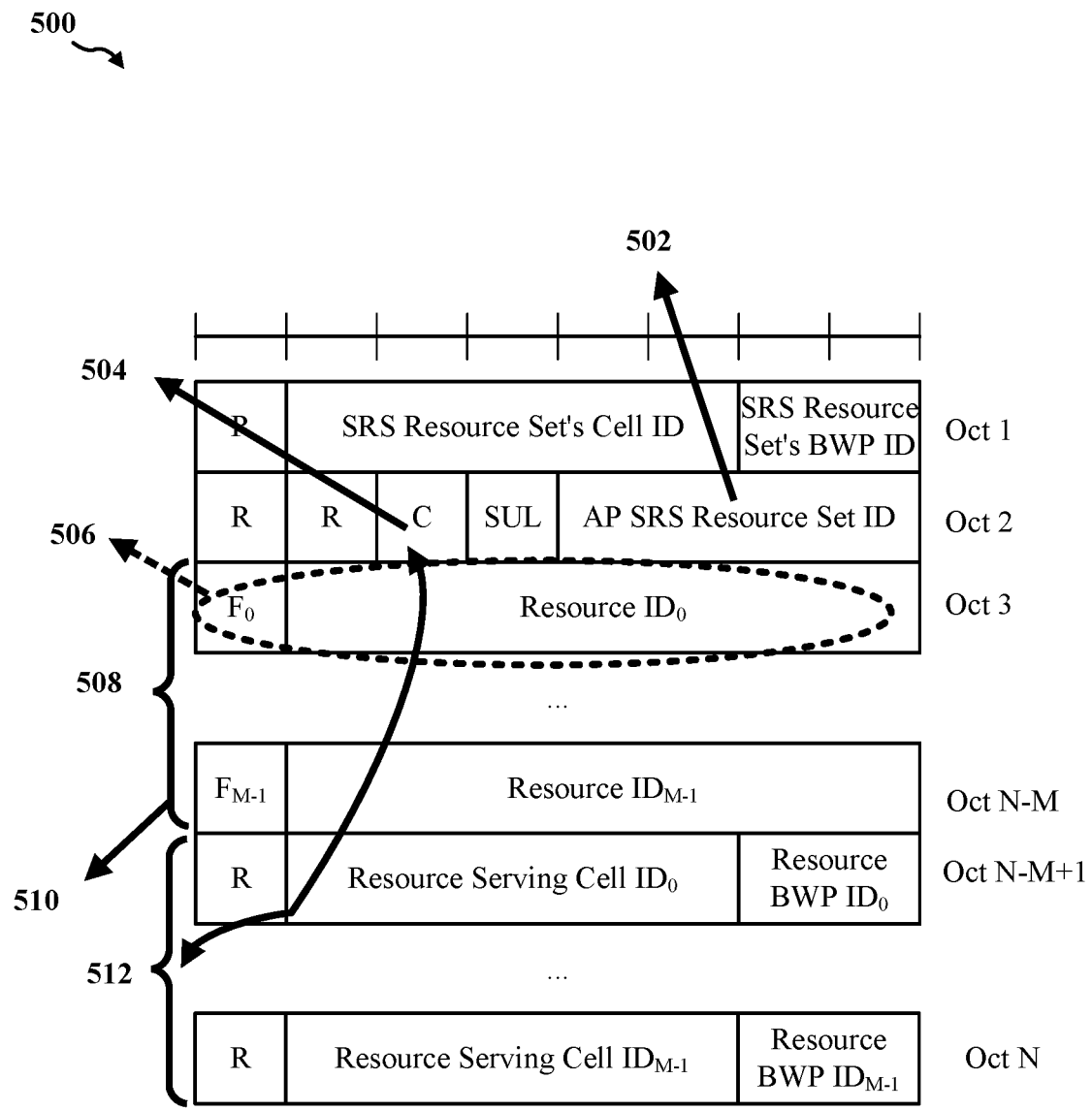
FIG. 5 is an example representation of MAC CE for an aperiodic SRS spatial relation indication.

FIG. 4 is an example representation of media access control (MAC) control element (CE) 400 for a semi-persistent sounding reference signal (SRS) resource set activation/deactivation. FIG. 5 is an example representation of MAC CE 500 for an aperiodic SRS spatial relation indication. For a semi-persistent/aperiodic SRS resource set, the spatial relation information of each of the SRS resources within the SRS resource may be updated by the MAC CE. For a semi-persistent SRS resource set, the same MAC CE activates the SRS resource set. For an aperiodic SRS resource set, the MAC CE only updates the spatial relation information.

In an example, for MAC CE 500, the AP SRS resource set ID 502 corresponds to the SRS resource set ID that MAC CE 500 corresponds to. If C field 504 is set to 1, the octets including Resource Serving Cell ID field(s) and Resource bandwidth part (BWP) ID field(s) are present. If C field 504 is set to 0, the Resource Serving Cell ID field(s) and Resource BWP ID field(s) are not present. $F_0$ 506 describes the type and identifier of the resource used for spatial relationship derivation for the SRS resource i. For example, at 508, if Fi is 0, then either the SSB index or the SRS resource index are used. If the first bit of Resource Idi is 0 then the reminder of the field includes SRS ResourceId. If the first of Resource Idi is 1 then the reminder of the field includes SSB index. At 510, if Fi equals 1 then the Resource Idi indicates a non-zero point (NZP) CSI-RS resource ID. At 512, the resources correspond to the M SRS resources within the SRS resource set.

Figure 6:
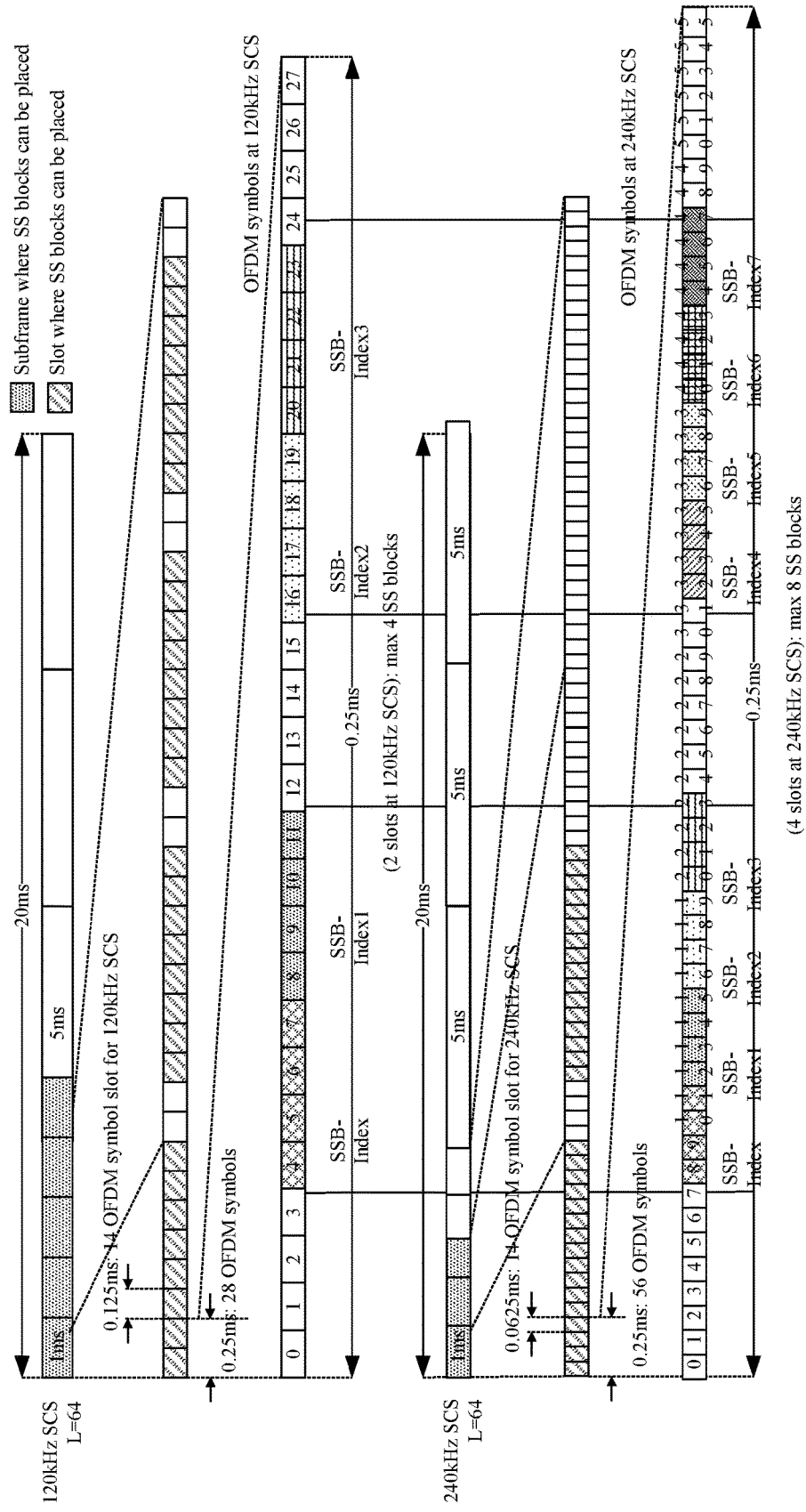
FIG. 6 illustrates an example representation of synchronization signal block (SSB) locations within a 5 millisecond (ms) half-frame.

FIG. 6 illustrates example synchronization signal block (SSB) locations within a 5 millisecond (ms) half-frame 600. Specifically, one SSB is 4 OFDM symbols and includes PSS, SSS, and PBCH/MIB. For example, the SSB set corresponds to a set of SSB indices associated with the same PCI (e.g., physCellId) in a given serving cell (CC) which is confined to a 5 ms time interval (e.g., first or second half of a frame). The periodicity of SS burst set may correspond to 5 ms, 10 ms, 20 ms, . . . , 160 ms (e.g., default periodicity=20 ms). The max number of SSBs within a 5 ms SS burst set may correspond to 4 (sub-3 GHz), 8 (sub-7 GHz), or 64 (FR2). The SSBs may be transmitted with different beams, and they are indexed with SSB-index and may correspond to 0, 1, . . . 63 (e.g., for 64 SSBs). Further, the time domain location (e.g., slots/OFDM symbols) of each SSB (within the 5 ms) is from a fixed set of patterns (e.g., depending on subcarrier spacing: 15 or 30 KHz for FR1; 120 or 240 KHz for FR2).

In an aspect, when accessing a cell (e.g., Pcell) from idle, UE determines the information through cell search procedures (i.e., from detected SSB (PSS/SSS/MIB) and SIB). For example, the PCI is determined from PSS and SSS signals. Some timing information is determined from PBCH/MIB, such as, half frame bit, SFN time, and SSB index of the detected SSB. Additionally, other information is determined from SIB (e.g., periodicity of SSB, etc.). For Scell, UE may be configured with SSB information through dedicated RRC signaling by the parameter ServingCellConfigCommon. For each serving cell (e.g., Pcell or Scell), there is only one SSB set with an associated PCI.

FIG. 7 illustrates various example representation of a MAC CE 700 using a resource bandwidth part (BWP) identification (ID) field and a reserved field. For a UE that is configured with multiple SSB sets corresponding to multiple PCIs in a given serving cell, a MAC-CE that updates spatial relation information for SRS resources within a SRS resource set can indicate a SSB set and a SSB-Index within the SSB set as RS for spatial relation information of a SRS resource. For example, the UE may use one or more of "resource BWP ID" field and a reserved "R" field in existing (i.e., Rel. 15 or 16 MAC-CE) that correspond to Resource $ID_i$ (e.g., associated with SRS resource i within the set) to indicate the SSB set while the corresponding resource ID field indicates a SSB-Index within the indicated SSB set. The field resource BWP ID is currently used only if the corresponding resource ID refers to a SRS-ResourceId and not in the case of SSB-Index or NZP CSI-RS resource ID. The number of SSB sets from which one can be indicated is configurable or depends on how many bits are used to indicate the SSB set. For example, if "R" is used, then an indication of one SSB set from 2 SSB sets (one additional/non-serving cell SSB set) may be made. If the "resource BWP ID" field is used, then the gNB may indicate one SSB set from 4 SSB sets (e.g., three additional). If both are used, then the gNB may indicate one SSB set from 8 SSB sets (e.g., 7 additional). The above interpretation (BWP ID field or reserved field indicating a SSB set) is followed when C equals 1 (e.g., the last M Octets are present), the corresponding $F_i$ equals 0, and the first bit of Resource $ID_i$ is 1 (e.g., reminder of the field Resource $ID_i$ contains a SSB-index). Otherwise, either the "resource BWP ID" field and a reserved "R" are not present or RS is not a SSB. In this example, C being equal 0 is not possible (i.e., if the last M Octets are not needed because "Resource serving cell IDs" are the same as serving cell ID of the SRS resource set). Hence, in this example, the overhead of the MAC-CE may be larger as the last M Octets should be present for SSB set indication to be possible.

FIG. 8 illustrates an example representation of a MAC CE 800 using one or more synchronization signal block (SSB) set ID fields. For example, one or more SSB set ID fields may be added to the MAC CE 800. The additional fields corresponding to SSB set IDs exist only if a field in the MAC-CE is set to 1. If that field is set to 0, then the additional fields corresponding to SSB set IDs do not exist. In this case (that field is set to 0), if SSB-index is used for spatial relation information update of a SRS resource, then the SSB index corresponds to the first SSB sets and not the SSB sets of the additional or non-serving cell SSB sets. For the one bit field, one of the reserved "R" bits in the current MAC-CE may be used. The first SSB set ID field (e.g., SSB set $ID_0$) corresponds to the first Resource ID field that includes a SSB-index (i.e., the first i for which $F_i$ equals to 0, and the first bit of Resource $ID_i$ is 1), and the last SSB set ID field (e.g., SSB set $ID_N$) corresponds to the last Resource ID field that contains a SSB-index. For example, N is the number SSB set IDs, which is the number of SRS resources with an updated spatial relation information that uses a SSB-index as the RS. Further, N needs to be less than or equal to M, wherein M is the number of SRS resources within the set. The length of each SSB set ID field may be predetermined or RRC-configured. For example, if the length is 2 bits, there may be 4 SSB sets (e.g., 3 additional SSB sets). In an aspect, the length of the MAC CE is a function of at least one of a length of each SSB set ID, number of SRS resources with an updated spatial relation information that uses a SSB-index as the RS, the value of the 1-bit field, and the value of C.

FIG. 9 is a flowchart of an example method 900 of wireless communication at an apparatus of a UE. In an example, a UE 104 can perform the functions described in method 900 using one or more of the components described in FIGS. 1, 3 and 10.

At block 902, the method 900 may receive a media access control (MAC) control element (CE) from a network entity indicating a synchronization signal block (SSB) set and a SSB index within the SSB set as a reference signal (RS) for spatial relation information of sounding reference signal (SRS) resource, wherein the UE is configured with a plurality of SSB sets corresponding to a plurality of physical cell identifications (PCIs) in a serving cell. In some aspects, the communicating component 342, such as in conjunction with processor(s) 312, memory 316, or transceiver 302, may be configured to receive a MAC CE from a network entity indicating a SSB set and a SSB index within the SSB set as a RS for spatial relation information of SRS resource, wherein the UE is configured with a plurality of SSB sets corresponding to a plurality of PCIs in a serving cell. Thus, the UE 104, the processor(s) 312, the communicating component 342 or one of its subcomponents may define the means for receiving a MAC CE from a network entity indicating a SSB set and a SSB index within the SSB set as a RS for spatial relation information of SRS resource, wherein the UE is configured with a plurality of SSB sets corresponding to a plurality of PCIs in a serving cell. For example, in an aspect, the UE 104 and/or the communicating component 342 may receive a signal, process the signal into a MAC CE, and/or performs other signal processes such as described above with respect to FIG. 3.

At block 904, the method 900 may update spatial relation information for one or more SRS resources within a SRS resource set based on the MAC CE. In some aspects, the communicating component 342, such as in conjunction with processor(s) 312, memory 316, or transceiver 302, may be configured to update spatial relation information for one or more SRS resources within a SRS resource set based on the MAC CE. Thus, the UE 104, the processor(s) 312, the communicating component 342 or one of its subcomponents may define the means for updating spatial relation information for one or more SRS resources within a SRS resource set based on the MAC CE. For example, in an aspect, the UE 104 and/or the communicating component 342 may configure the processor 312 and/or transceiver 302 to update, and/or performs other signal processes such as described above with respect to FIG. 3.

In some implementations, a resource identification (ID) associated with the SRS resource corresponds to one or more of a resource bandwidth part (BWP) ID field and a reserved field that indicate one of the plurality of SSB sets.

In some implementations, the resource ID indicates a SSB index within the one of the plurality of SSB sets.

In some implementations, the communicating component 342, such as in conjunction with processor(s) 312, memory 316, or transceiver 302, may determine whether the resource ID corresponds to a SRS resource ID; and utilize a resource BWP ID of the resource BWP ID field based on the determination that the resource ID corresponds to the SRS resource ID.

In some implementations, the communicating component 342, such as in conjunction with processor(s) 312, memory 316, or transceiver 302, may forgo utilization of the resource BWP ID based on the determination that the resource ID does not correspond to the SRS resource ID, wherein the resource ID corresponds to at least one of a SSB index or non-zero power (NZP) channel state information reference signal (CSI-RS) resource ID.

In some implementations, a number of the plurality of SSB sets is based on usage of at least one of the reserved field or resource BWP ID field.

In some implementations, the MAC CE includes one or more SSB set identification (ID) fields.

In some implementations, the communicating component 342, such as in conjunction with processor(s) 312, memory 316, or transceiver 302, may determine whether a designated field of the MAC CE is set to one; and configure one or more additional fields of the MAC CE to correspond to the one or more SSB set ID fields based on the determination that the designated field of the MAC CE is set to one.

In some implementations, the communicating component 342, such as in conjunction with processor(s) 312, memory 316, or transceiver 302, may configure the SSB index corresponds to the first SSB sets of the plurality of SSB sets.

In some implementations, a first SSB set ID field of the one or more SSB set ID fields corresponds to a first resource ID field comprising the SSB index.

In some implementations, a last SSB set ID field of the one or more SSB set ID fields corresponds to a last resource ID field comprising the SSB index.

In some implementations, a length of each of the one or more SSB set ID fields is at least one of predetermined or radio resource control (RRC) configured.

In some implementations, a length of the MAC CE is based at least on one of a length of each SSB set ID, a number of SRS resources with an updated spatial relation information that uses a SSB index as the RS, a value of a one-bit field, and a value of a last number of octets present.

In some implementations, the MAC CE corresponds to a semi-persistent SRS resource set activation/deactivation.

In some implementations, the MAC CE corresponds to an aperiodic SRS spatial relation indication.

In some implementations, a UE capability signaling message indicates a number of the plurality of SSB sets and a number of physical cell identifications (PCIs).

In some implementations, the UE capability signaling message is designated for at least one of per component carrier (CC)/serving cell or for all CCs/serving cells.

In some implementations, a UE capability signaling message indicates a total number of SSBs of the plurality of SSB sets used as at least one of the RS for the spatial relation information, quasi-co-location (QCL) information, or a pathloss RS.

In some implementations, the UE capability signaling message is designated for at least one of per component carrier (CC)/serving cell or for all CCs/serving cells.

Figure 10:
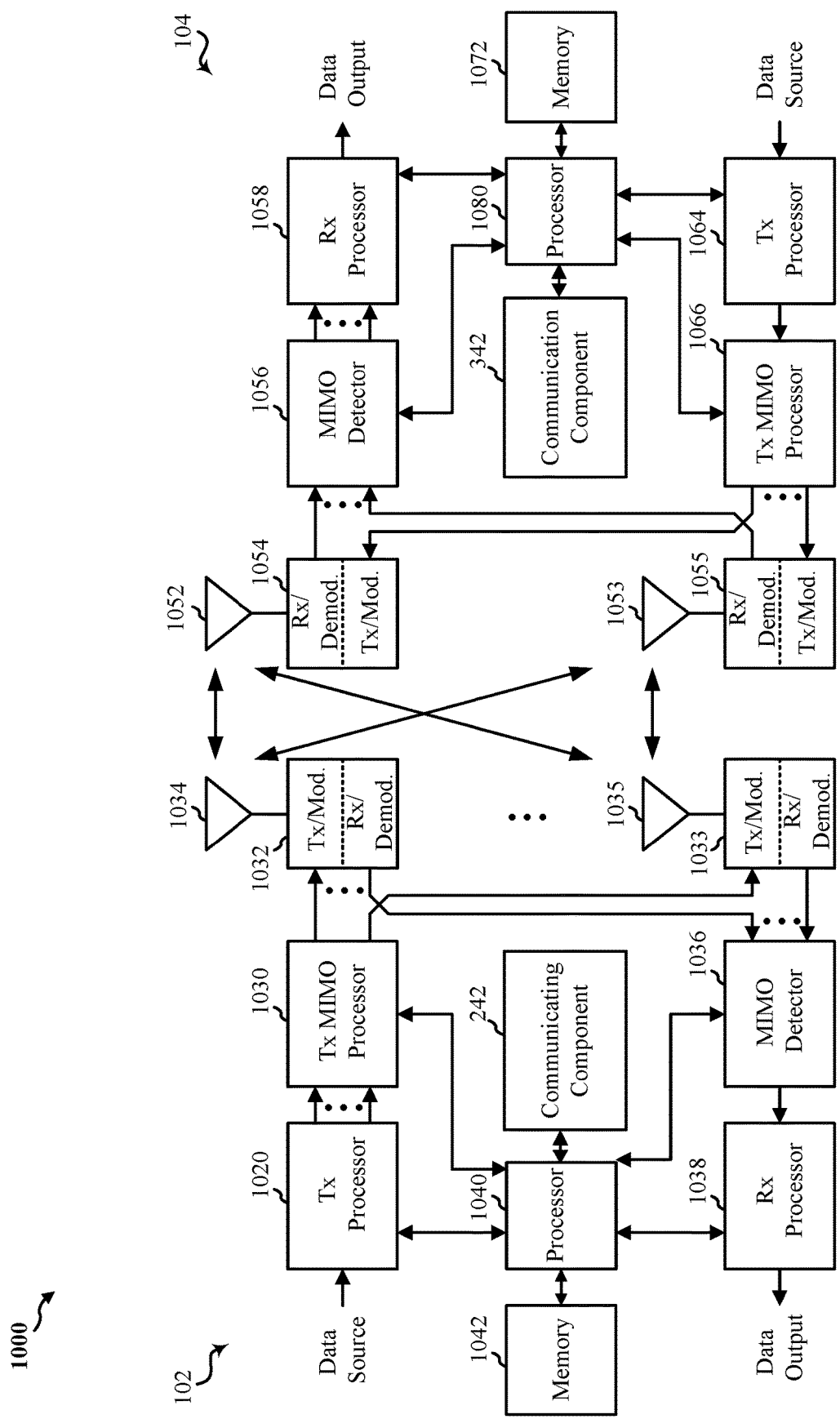
FIG. 10 is a block diagram illustrating an example of a multiple-input and multiple-output (MIMO) communication system including a base station and a UE.

FIG. 10 is a block diagram of a MIMO communication system 1000 including a base station 102 and a UE 104. The MIMO communication system 1000 may be configured to enable media access control (MAC) control element (CE) spatial relation information update for sounding reference signal (SRS), described herein. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 also may generate control symbols or reference symbols. A transmit MIMO processor 1030 may perform spatial processing (such as precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (such as for OFDM, etc.) to obtain an output sample stream. Each modulator/demodulator 1032 through 1033 may further process (such as convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1 and 2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (such as filter, amplify, downconvert, and digitize) a respective received signal to obtain input samples. Each modulator/demodulator 1054 through 1055 may further process the input samples (such as for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (such as demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see such as FIGS. 1 and 2).

On the uplink (UL), at the UE 104, a transmit processor 1064 may receive and process data from a data source. The transmit processor 1064 also may generate reference symbols for a reference signal. The symbols from the transmit processor 1064 may be precoded by a transmit MIMO processor 1066 if applicable, further processed by the modulator/demodulators 1054 and 1055 (such as for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

SOME FURTHER EXAMPLE CLAUSES

Implementation examples are described in the following numbered clauses:

1. A method of wireless communication at a user equipment (UE), comprising:
   receiving a media access control (MAC) control element (CE) from a network entity indicating a synchronization signal block (SSB) set and a SSB index within the SSB set as a reference signal (RS) for configuring spatial relation information of a sounding reference signal (SRS) resource, wherein the UE is configured with a plurality of SSB sets corresponding to a plurality of physical cell identifications (PCIs) in a serving cell; and
   updating the spatial relation information for one or more SRS resources within a SRS resource set based on the MAC CE.

2. The method of any preceding clause, wherein a resource identification (ID) associated with the SRS resource corresponds to one or more of a resource bandwidth part (BWP) ID field and a reserved field that indicate one of the plurality of SSB sets.

3. The method of any preceding clause, wherein the resource ID indicates a SSB index within the one of the plurality of SSB sets.

4. The method of any preceding clause, wherein a number of the plurality of SSB sets is based on usage of at least one of the reserved field or resource BWP ID field.

5. The method of any preceding clause, wherein the MAC CE includes one or more SSB set identification (ID) fields.

6. The method of any preceding clause, further comprising:
   determining whether a designated field of the MAC CE is set to one; and
   configuring one or more additional fields of the MAC CE to correspond to the one or more SSB set ID fields based on the determination that the designated field of the MAC CE is set to one.

7. The method of any preceding clause, further comprising:
   determining whether the SSB index is used for updating the spatial relation information for the one or more SRS resources; and configuring the SSB index to correspond to a first portion of SSB sets of the plurality of SSB sets based on the determination that the designated field of the MAC CE is not set to one and that the SSB index is used for updating the spatial relation information for the one or more SRS resources.

8. The method of any preceding clause, wherein a first SSB set ID field of the one or more SSB set ID fields corresponds to a first resource ID field comprising the SSB index.

9. The method of any preceding clause, wherein a last SSB set ID field of the one or more SSB set ID fields corresponds to a last resource ID field comprising the SSB index.

10. The method of any preceding clause, wherein a length of each of the one or more SSB set ID fields is at least one of predetermined or radio resource control (RRC) configured.

11. The method of any preceding clause, wherein a length of the MAC CE is based at least on one of a length of each SSB set ID, a number of SRS resources with an updated spatial relation information that uses a SSB index as the RS, a value of a one-bit field, and a value of a last number of octets present.

12. The method of any preceding clause, wherein the MAC CE triggers activation/deactivation of a semi-persistent SRS resource set.

13. The method of any preceding clause, wherein the MAC CE triggers an aperiodic SRS spatial relation indication.

14. The method of any preceding clause, wherein a UE capability signaling message indicates a number of the plurality of SSB sets and a number of physical cell identifications (PCIs).

15. The method of any preceding clause, wherein the UE capability signaling message is designated for at least one of per component carrier (CC)/serving cell or for all CCs/serving cells.

16. The method of any preceding clause, wherein a UE capability signaling message indicates a total number of SSBs of the plurality of SSB sets used as at least one of the RS for the spatial relation information, quasi-co-location (QCL) information, or a pathloss RS.

17. The method of any preceding clause, wherein the UE capability signaling message is designated for at least one of per component carrier (CC)/serving cell or for all CCs/serving cells.

18. An apparatus for wireless communication at a user equipment (UE), comprising:
   a transceiver;
   a memory configured to store instructions; and
   one or more processors communicatively coupled with the transceiver and the memory, wherein the one or more processors are configured to execute the instructions to:
      receive a media access control (MAC) control element (CE) from a network entity indicating a synchronization signal block (SSB) set and a SSB index within the SSB set as a reference signal (RS) for configuring spatial relation information of the sounding reference signal (SRS) resource, wherein the UE is configured with a plurality of SSB sets corresponding to a plurality of physical cell identifications (PCIs) in a serving cell; and
      update the spatial relation information for one or more SRS resources within a SRS resource set based on the MAC CE.

19. The apparatus of any preceding clause, wherein a resource identification (ID) associated with the SRS resource corresponds to one or more of a resource bandwidth part (BWP) ID field and a reserved field that indicate one of the plurality of SSB sets.

20. The apparatus of any preceding clause, wherein the resource ID indicates a SSB index within the one of the plurality of SSB sets.

21. The apparatus of any preceding clause, wherein a number of the plurality of SSB sets is based on usage of at least one of the reserved field or resource BWP ID field.

22. The apparatus of any preceding clause, wherein the MAC CE includes one or more SSB set identification (ID) fields.

23. The apparatus of any preceding clause, further comprising:
   determining whether a designated field of the MAC CE is set to one; and
   configuring one or more additional fields of the MAC CE to correspond to the one or more SSB set ID fields based on the determination that the designated field of the MAC CE is set to one.

24. The apparatus of any preceding clause, further comprising:
   determining whether the SSB index is used for updating the spatial relation information for the one or more SRS resources; and
   configuring the SSB index to correspond to a first portion of SSB sets of the plurality of SSB sets based on the determination that the designated field of the MAC CE is not set to one and that the SSB index is used for updating the spatial relation information for the one or more SRS resources.

25. The apparatus of any preceding clause, wherein a first SSB set ID field of the one or more SSB set ID fields corresponds to at least one of a first resource ID field comprising the SSB index or a last resource ID field comprising the SSB index.

26. The apparatus of any preceding clause, wherein a length of each of the one or more SSB set ID fields is at least one of predetermined or radio resource control (RRC) configured.

27. The apparatus of any preceding clause, wherein a length of the MAC CE is based at least on one of a length of each SSB set ID, a number of SRS resources with an updated spatial relation information that uses a SSB index as the RS, a value of a one-bit field, and a value of a last number of octets present.

28. The apparatus of any preceding clause, wherein the MAC CE corresponds to at least one of a semi-persistent SRS resource set activation/deactivation or an aperiodic SRS spatial relation indication.

29. An apparatus for wireless communication at a user equipment (UE), comprising:
   means for receiving a media access control (MAC) control element (CE) from a network entity indicating a synchronization signal block (SSB) set and a SSB index within the SSB set as a reference signal (RS) for configuring spatial relation information of a sounding reference signal (SRS) resource, wherein the UE is configured with a plurality of SSB sets corresponding to a plurality of physical cell identifications (PCIs) in a serving cell; and
   means for the updating spatial relation information for one or more SRS resources within a SRS resource set based on the MAC CE.

30. A non-transitory computer-readable medium at a user equipment (UE), comprising code executable by one or more processors to:
- receive a media access control (MAC) control element (CE) from a network entity indicating a synchronization signal block (SSB) set and a SSB index within the SSB set as a reference signal (RS) for configuring spatial relation information of a sounding reference signal (SRS) resource, wherein the UE is configured with a plurality of SSB sets corresponding to a plurality of physical cell identifications (PCIs) in a serving cell; and
- update the spatial relation information for one or more SRS resources within a SRS resource set based on the MAC CE.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at a user equipment (UE), comprising:
   receiving a media access control (MAC) control element (CE) indicating a synchronization signal block (SSB) set and a SSB index within the SSB set as a reference signal (RS) for configuring spatial relation information of a sounding reference signal (SRS) resource, wherein the UE is configured with a plurality of SSB sets corresponding to a plurality of physical cell identifications (PCIs); and
   updating the spatial relation information for one or more SRS resources within a SRS resource set based on the MAC CE, wherein:
      a resource identification (ID) associated with the SRS resource corresponds to one or more of a resource bandwidth part (BWP) ID field and a reserved field that indicate one of the plurality of SSB sets;
      the resource ID indicates a SSB index within the one of the plurality of SSB sets; and
      a number of the plurality of SSB sets is based on usage of at least one of the reserved field or the resource BWP ID field.

2. The method of claim 1, wherein the MAC CE includes one or more SSB set identification (ID) fields.

3. The method of claim 2, further comprising:
   determining whether a designated field of the MAC CE is set to one; and
   configuring one or more additional fields of the MAC CE to correspond to the one or more SSB set ID fields based on the determination that the designated field of the MAC CE is set to one.

4. The method of claim 3, further comprising:
   determining whether the SSB index is used for updating the spatial relation information for the one or more SRS resources; and
   configuring the SSB index to correspond to a first portion of SSB sets of the plurality of SSB sets based on the determination that the designated field of the MAC CE is not set to one and that the SSB index is used for updating the spatial relation information for the one or more SRS resources.

5. The method of claim 2, wherein a first SSB set ID field of the one or more SSB set ID fields corresponds to a first resource ID field comprising the SSB index.

6. The method of claim 2, wherein a last SSB set ID field of the one or more SSB set ID fields corresponds to a last resource ID field comprising the SSB index.

7. The method of claim 2, wherein a length of each of the one or more SSB set ID fields is at least one of predetermined or radio resource control (RRC) configured.

8. The method of claim 2, wherein a length of the MAC CE is based at least on one of a length of each SSB set ID, a number of SRS resources with an updated spatial relation information that uses a SSB index as the RS, a value of a one-bit field, and a value of a last number of octets present.

9. The method of claim 1, wherein the MAC CE triggers activation/deactivation of a semi-persistent SRS resource set.

10. The method of claim 1, wherein the MAC CE triggers an aperiodic SRS spatial relation indication.

11. The method of claim 1, wherein a UE capability signaling message indicates a number of the plurality of SSB sets and a number of physical cell identifications (PCIs).

12. The method of claim 11, wherein the UE capability signaling message is designated for at least one of per component carrier (CC)/serving cell or for all CCs/serving cells.

13. The method of claim 1, wherein a UE capability signaling message indicates a total number of SSBs of the plurality of SSB sets used as at least one of the RS for the spatial relation information, quasi-co-location (QCL) information, or a pathloss RS.

14. The method of claim 13, wherein the UE capability signaling message is designated for at least one of per component carrier (CC)/serving cell or for all CCs/serving cells.

15. A user equipment (UE), comprising:
   a transceiver;
   memory configured to store instructions; and
   one or more processors communicatively coupled with the transceiver and the memory, wherein the one or more processors are configured to execute the instructions to cause the UE to:
      receive, via the transceiver, a media access control (MAC) control element (CE) indicating a synchronization signal block (SSB) set and a SSB index within the SSB set as a reference signal (RS) for configuring spatial relation information of a sounding reference signal (SRS) resource, wherein the UE is configured with a plurality of SSB sets corresponding to a plurality of physical cell identifications (PCIs); and
      update the spatial relation information for one or more SRS resources within a SRS resource set based on the MAC CE, wherein:
         a resource identification (ID) associated with the SRS resource corresponds to one or more of a resource bandwidth part (BWP) ID field and a reserved field that indicate one of the plurality of SSB sets;
         the resource ID indicates a SSB index within the one of the plurality of SSB sets; and
         a number of the plurality of SSB sets is based on usage of at least one of the reserved field or the resource BWP ID field.

16. The apparatus of claim 15, wherein the MAC CE includes one or more SSB set identification (ID) fields.

17. The apparatus of claim 16, wherein the one or more processors are configured to further cause the UE to:
   determine whether a designated field of the MAC CE is set to one; and
   configure one or more additional fields of the MAC CE to correspond to the one or more SSB set ID fields based on the determination that the designated field of the MAC CE is set to one.

18. The apparatus of claim 17, wherein the one or more processors are configured to further cause the UE to:
   determine whether the SSB index is used for updating the spatial relation information for the one or more SRS resources; and
   configure the SSB index to correspond to a first portion of SSB sets of the plurality of SSB sets based on the determination that the designated field of the MAC CE is not set to one and that the SSB index is used for updating the spatial relation information for the one or more SRS resources.

19. The apparatus of claim 16, wherein a first SSB set ID field of the one or more SSB set ID fields corresponds to at least one of a first resource ID field comprising the SSB index or a last resource ID field comprising the SSB index.

20. The apparatus of claim 16, wherein a length of each of the one or more SSB set ID fields is at least one of predetermined or radio resource control (RRC) configured.

21. The apparatus of claim 16, wherein a length of the MAC CE is based at least on one of a length of each SSB set ID, a number of SRS resources with an updated spatial relation information that uses a SSB index as the RS, a value of a one-bit field, and a value of a last number of octets present.

22. The apparatus of claim 15, wherein the MAC CE corresponds to at least one of a semi-persistent SRS resource set activation/deactivation or an aperiodic SRS spatial relation indication.

23. A method of wireless communication at a user equipment (UE), comprising:
  receiving a media access control (MAC) control element (CE) indicating a synchronization signal block (SSB) set and a SSB index within the SSB set as a reference signal (RS) for configuring spatial relation information of a sounding reference signal (SRS) resource, wherein:
    the UE is configured with a plurality of SSB sets corresponding to a plurality of physical cell identifications (PCIs), and
    the MAC CE includes one or more SSB set identification (ID) fields;
  updating the spatial relation information for one or more SRS resources within a SRS resource set based on the MAC CE;
  determining whether a designated field of the MAC CE is set to one; and
  configuring one or more additional fields of the MAC CE to correspond to the one or more SSB set ID fields based on the determination that the designated field of the MAC CE is set to one.

24. The method of claim 23, further comprising:
  determining whether the SSB index is used for updating the spatial relation information for the one or more SRS resources; and
  configuring the SSB index to correspond to a first portion of SSB sets of the plurality of SSB sets based on the determination that the designated field of the MAC CE is not set to one and that the SSB index is used for updating the spatial relation information for the one or more SRS resources.

25. The method of claim 23, wherein a first SSB set ID field of the one or more SSB set ID fields corresponds to a first resource ID field comprising the SSB index.

26. The method of claim 23, wherein a last SSB set ID field of the one or more SSB set ID fields corresponds to a last resource ID field comprising the SSB index.

27. The method of claim 23, wherein a length of each of the one or more SSB set ID fields is at least one of predetermined or radio resource control (RRC) configured.

28. The method of claim 23, wherein a length of the MAC CE is based at least on one of a length of each SSB set ID, a number of SRS resources with an updated spatial relation information that uses a SSB index as the RS, a value of a one-bit field, and a value of a last number of octets present.

29. A user equipment (UE), comprising:
  a transceiver;
  memory configured to store instructions; and
  one or more processors communicatively coupled with the transceiver and the memory, wherein the one or more processors are configured to execute the instructions to cause the UE to:
    receive, via the transceiver, a media access control (MAC) control element (CE) indicating a synchronization signal block (SSB) set and a SSB index within the SSB set as a reference signal (RS) for configuring spatial relation information of a sounding reference signal (SRS) resource, wherein:
      the UE is configured with a plurality of SSB sets corresponding to a plurality of physical cell identifications (PCIs), and
      the MAC CE includes one or more SSB set identification (ID) fields;
    update the spatial relation information for one or more SRS resources within a SRS resource set based on the MAC CE;
    determine whether a designated field of the MAC CE is set to one; and
    configure one or more additional fields of the MAC CE to correspond to the one or more SSB set ID fields based on the determination that the designated field of the MAC CE is set to one.

30. The apparatus of claim 29, wherein at least one of:
  the one or more processors are configured to further cause the UE to determine whether the SSB index is used for updating the spatial relation information for the one or more SRS resources, and configure the SSB index to correspond to a first portion of SSB sets of the plurality of SSB sets based on the determination that the designated field of the MAC CE is not set to one and that the SSB index is used for updating the spatial relation information for the one or more SRS resources;
  a first SSB set ID field of the one or more SSB set ID fields corresponds to at least one of a first resource ID field comprising the SSB index or a last resource ID field comprising the SSB index;
  a length of each of the one or more SSB set ID fields is at least one of predetermined or radio resource control (RRC) configured;
  a length of the MAC CE is based at least on one of a length of each SSB set ID, a number of SRS resources with an updated spatial relation information that uses a SSB index as the RS, a value of a one-bit field, and a value of a last number of octets present; or
  the MAC CE corresponds to at least one of a semi-persistent SRS resource set activation/deactivation or an aperiodic SRS spatial relation indication.

* * * * *